March 8, 1932.   R. M. MESERVE   1,848,188
OIL AND WATER HEATER FOR INTERNAL COMBUSTION ENGINES
Filed April 18, 1929
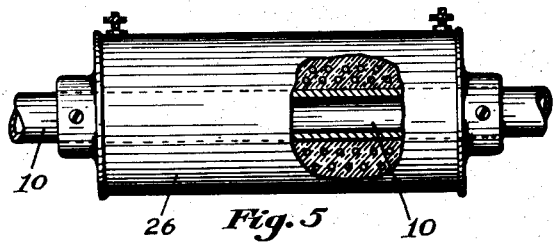
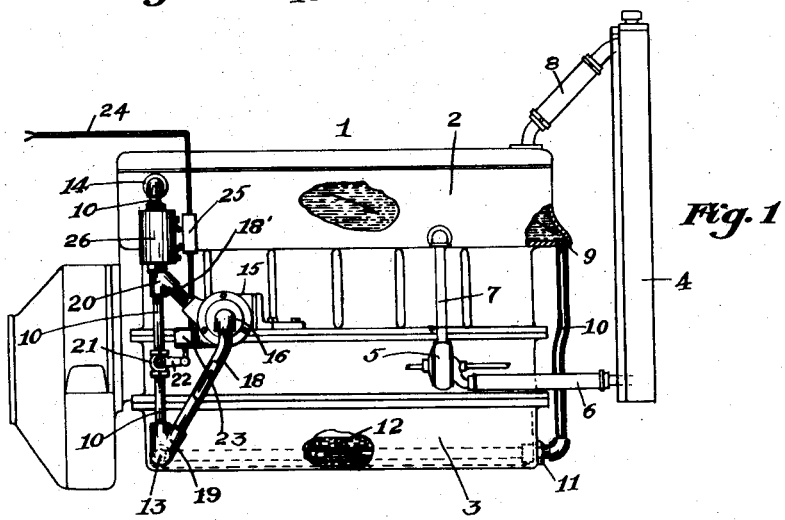
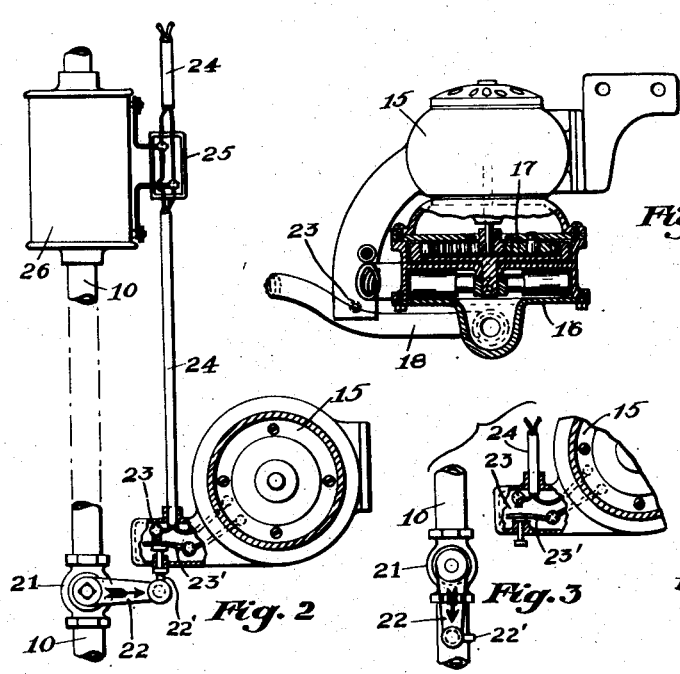
Inventor.
Raymond M. Meserve.
BY
Henry L. Chenery
Attorney.

Patented Mar. 8, 1932

1,848,188

UNITED STATES PATENT OFFICE

RAYMOND M. MESERVE, OF PORTLAND, MAINE, ASSIGNOR OF ONE-HALF TO RAYMOND C. STEARNS, OF PORTLAND, MAINE

OIL AND WATER HEATER FOR INTERNAL COMBUSTION ENGINES

Application filed April 18, 1929. Serial No. 356,192.

The invention to be hereinafter described relates to apparatus by means of which the operation of starting internal combustion engines in motor vehicles is accomplished during extremely low atmospheric temperature periods substantially as easily and expeditiously as can be done in the case of the ordinarily equipped engine in very moderate weather.

A large proportion of automobile owners store their cars in unheated garages and many make it a practice to park them during the day time in open spaces. In the colder months of the year and in certain sections of the country, the lubricating oil in the engine thus exposed becomes congealed and the temperature of the cylinder cooling water falls so low that starting of the engine, if it can be accomplished at all, is effected only after long and continuous cranking of the engine, frequently resulting in injury to the storage battery which operates the starting motor.

The general object of my present invention is to provide facilities to raise the temperature of the crank-case oil and the cylinder cooling water previous to any attempt being made to start the engine when abnormally cold.

To attain this object I provide a water pipe which connects with one end of the cylinder water jacket, extends downwardly and enters the interior of the crank-case and passes along the entire length of the latter, immersed in the crank-case oil. Passing out of the crank-case the pipe extends upwardly and again makes connection with the water jacket, at its opposite end.

Surrounding the water pipe at any convenient location is an electric heating unit by means of which the water in the pipe is raised in temperature, and, either thermally or by forced pressure, a circulation of this water through the pipe is maintained.

Modern type gasoline engines employ a pump to cause the cylinder cooling water to circulate through the radiator. When the engine is idle, no circulation takes place.

With my arrangement and method of operating, whereby only the water in the pipe and in the cylinder jackets is included in the circulatory system, the radiator water, when the engine is idle, is cut off and a much smaller quantity of water is required to be heated by the heating unit.

The character of the invention may be best understood by reference to the description hereinafter found in the specification when taken in connection with the accompanying drawings in which a preferred embodiment thereof is disclosed.

In the drawings,—

Fig. 1 is a side elevation of a gasoline, internal combustion engine shown equipped with my apparatus;

Fig. 2 is an enlarged detail showing a wiring diagram to the heater and circulating pump motor, together with the valve which shifts the circulation from "thermal" operation to forced feed;

Fig. 3 is a fragmentary view of Fig. 2, with the valve shown in a different position;

Fig. 4 is a plan view, partly in section, showing the motor and pump for circulating the water, and Fig. 5 is a view of the heating unit with a portion thereof shown broken away.

Similar reference characters are employed to identify like parts in all the different views of the drawings.

Referring to the drawings, 1 represents a side view of an internal combustion engine having a cylinder water jacket 2, a crank-case 3 and a radiator 4. The usual water circulating pump is shown at 5, with a pipe 6 through which water is drawn from the radiator and a pipe 7 through which it passes from the pump to the water-jacket; a pipe 8 conveys the water from the jacket to the radiator and completes the circulatory water cooling system of the power plant. The foregoing elements are common to all gasoline engines.

From a point 9 on the water jacket, a pipe 10 depends and at the connection at 11 enters the crank-case, continues therethrough immersed in the oil 12 and passes out at 13. Extending upwardly from this point the pipe 10 again makes connection with the water jacket, at 14, on the end opposite that from which it started at 9.

Secured on any available place on the engine base is a small electric motor 15 and preferably attached thereto so as to provide a compact unit pumping plant is a rotary pump 16, which, as shown, is driven through speed reduction gears 17.

The pump suction pipe 18 connects with the Y fitting 19 and the discharge pipe 18' from the pump enters the Y fitting 20.

On the portion of the pipe 10 interjacent the fittings 19 and 20 is a valve 21 the function of which being to direct the flow of the water either through the pipe or to by-pass it around a portion of the latter, through the pump 16.

Above the fitting 20 is located the electric heating unit which may be of any approved type.

In Figs. 2 and 3 is illustrated the arrangement whereby the water may be circulated through the system by either thermal or by forced pressure means. In Fig. 2 the valve is shown closed and water in the pipe 10, after the latter passes out of the crank-case, must continue through the pipe 18 to the pump. But when the water is thus directed the pump must operate, so, to provide for this I employ a switch 23 which, when the valve lever 22 is positioned as shown in Fig. 2, automatically acts to close the electric circuit to the motor—starting the actuation of the pump.

In this circumstance, the water, by being conveyed at greater speed through the system will cause a more rapid transmission and radiation of the heat therethrough, and this method is the proper one to apply when it is desired to obtain results quickly.

But it is often advantageous to operate under a slower circulation and economize in the consumption of electric current which would apply in case the heater only was left in operation over prolonged periods with the motor and pump idle. This arrangement contemplates circulating the water wholly through the agency of heat—or thermally.

In Fig. 3 the valve 21 is shown in open position and the water now flows through the valve and the vertical portion of the pipe 10—no circulation or movement of the water through the pipe 18 now being possible on account of the pump being stopped.

It will be observed by reference to Fig. 3 that the switch 23 is now open, the points being separated by reason of the downward tension of the flexible arm 23' of the switch.

Thus by closing the valve, the projection 22' on the valve lever 22 forces the spring arm 23' upwardly into contact with the other point of the switch, closing the latter and starting the motor. The water is in this case circulated by forced pressure, but upon opening the valve, the projection 22' releases the flexible arm 23' and causes the circuit to open—stopping the motor.

While it may be possible to operate the apparatus by relying on the storage battery of the motor vehicle to supply the electric current to operate the heater and the pump motor, this method is not herein contemplated, as it would involve too great a drain on the storage battery.

Practically all garages are supplied with electric current for lighting purposes, and this provides a convenient and accessible source from which to obtain electric current for the present purpose.

The cable 24 is extended from a proper fitting (not shown) secured on the motor vehicle, to which fitting the cord from the lamp socket on the power line is plugged in. This cable passes to the binding posts in the box 25, and from these posts extend wires to the heater 26 and to the switch box 23. There is therefore, current passing to the heater whether or not the motor 15 is operating.

Upon reading the foregoing, the method of operating the apparatus will be obvious and, it is believed, the advantages accruing from its use will be likewise clearly seen.

When the engine is abnormally cold, the oil congeals in the bearings and crank-case and between the pistons and cylinder walls and a situation obtains when an attempt is made to start the engine in which it is possible to do great injury to the wearing surfaces, through inability of the oil-pump (not shown) to handle the congealed oil. Furthermore, the starting motor must be greatly over-worked under the conditions as just recited, and the storage battery from which current is drawn to operate it, taxed beyond the safety point. By slightly raising the temperature of the oil in the crank-case this difficulty is eliminated.

But to more completely provide for easy engine-starting conditions, the combustion chambers of the cylinders should be slightly warmed before they receive the fuel mixture.

This object, as will have been observed after following the description in the foregoing text, is accomplished through the agency of the same water which is employed to heat the oil, and therefore a dual function is exercised by the water and water heater which, together, provide all the essentials necessary for the expeditious motivity of the engine.

Various modifications in structural form and arrangement of the parts are possible without departure from the meaning and intent of the invention, and the present disclosure, therefore, is to be understood as simply illustrative and susceptible of such changes as are within the scope of the subjoined claims.

What I claim as new and desire to secure by Letters Patent is:

1. In oil and water heating apparatus for an internal combustion engine, comprising in combination with the water-jacket therefor, a conduit adapted to convey water from and return it into said water-jacket, a portion of said conduit passing through the interior, lower portion of the crank-case of said engine, an electric heating unit operable to raise the temperature of the water in said conduit, a by-pass conduit making connection with said first mentioned conduit at two separated locations thereon, a water pump on said by-pass conduit, an electric motor to drive said water pump, a valve on said conduit intermediate the two points of connection therewith of said by-pass conduit, and means whereby an electric current may be conducted to said heating unit and said motor.

2. In oil and water heating apparatus for an internal combustion engine having characteristics according to claim 1, and in addition, a switch operable to open and close the electric circuit to said motor, a lever on said valve by which it may be opened and closed, a projection on said lever adapted to engage said switch and close the electric circuit therethrough simultaneously with the closing of said valve, and conversely, to allow said circuit to be opened when said valve is open.

In testimony whereof I affix my signature.

RAYMOND M. MESERVE.